United States Patent

[11] 3,615,794

[72] Inventor Kenneth H. Nimerick
 Tulsa, Okla.
[21] Appl. No. 730,578
[22] Filed May 20, 1968
[45] Patented Oct. 26, 1971
[73] Assignee The Dow Chemical Company
 Midland, Mich.

[54] SEALING COMPOSITION AND METHOD
 7 Claims, No Drawings
[52] U.S. Cl. .................................................. 106/208,
 106/209, 252/8.55, 260/17.4
[51] Int. Cl. .................................................. C08b 25/00
[50] Field of Search........................................ 106/205,
 208, 209; 252/8.55 A; 195/1–69; 260/17.4

[56] References Cited
UNITED STATES PATENTS

| 3,372,072 | 5/1968 | Chrisp | 149/20 |
| 3,301,723 | 1/1967 | Chrisp | 149/20 |
| 3,096,284 | 2/1963 | Slate | 252/8.55 A |

OTHER REFERENCES

Chem. Abst. Vol. 52: 6837, 1958 Copy in Chem. Library

*Primary Examiner*—Lorenzo B. Hayes
*Attorneys*—Griswold & Burdick, C. Kenneth Bjork and Bruce M. Kanuch

ABSTRACT: A composition of matter and method of temporarily sealing selected intervals of boreholes, said composition comprising a combination of at least one galactomannan gum, a buffering agent, a cross-linking and hydrating agent for said gum, a suspending agent for said gum, and, optionally, degradation agent for said gum and water. The method comprises injecting said composition into said interval in a borehole.

SEALING COMPOSITION AND METHOD

BACKGROUND

Many methods have been employed for the treatment employ fibrous, boreholes such as those found in gas wells, oil wells and similar boreholes, to seal and plug off selected intervals. Three of the more common methods have been to employ fibrous, flaky or granular plugging agents, cementing the boreholes, and employing various viscous gels as plugging and sealing agents. All of these present methods suffer from certain disadvantages. Namely, the use of fibrous materials, e.g., hay, sponges, etc., has not been entirely successful and in many instances an impervious seal is not obtained in vuggs or fissures even when large quantities of material are pumped into the zone. The use of cement requires an extended period of time to allow the cement to set and to drill through the cement once circulation has been regained. Furthermore, the use of cement can be quite expensive and resultant damage to producing formations can be extensive. The more recent use of gels, such as cross-linked polysaccharides, has proved to be a great improvement over the former two methods. However, difficulties found in the use of many of these gels include, instability of the gels with pH changes, nonuniformity of the gel solutions placed into the borehole, premature setting up of the gels, prolonged setting time, failure of the gel to break down within a certain predetermined period of time, high fluid loss of the unset gels, and weakness of the set gel to extrusion caused by pressures. Many of these disadvantages have been overcome by the use of a novel temporarily plugging gel combination consisting of a galactomannan gum treated with a hydrophobing agent, a synthetic water dispersible polymeric thickening agent, a buffering agent, a cross-linking and hydration agent, optionally, a degradation agent, and water. The present temporary plugging gel composition demonstrates uniformity, strength, predictable gellation and setting times, good fluid retaining characteristics, and stability to a wide range of pH values. The gel solution may be prepared at the use site employing locally available fresh water supplies having a wide divergence in pH ranges e.g., 3 to 10.

SUMMARY

The present invention consists of employing as a temporary sealing and plugging agent in the plugging of selected intervals in boreholes a temporary plugging gel composition comprising:

a. a hydrophobically treated galactomannan gum;
b. a water-swellable suspending agent;
c. a buffering agent;
d. a cross-linking and hydration agent for said gum;
e. water, and
f. optionally, a degradation agent.

The constituents are admixed together with a sufficient amount of water to make a readily pumpable mixture. The slightly viscous gel solution is introduced into the formation to be sealed where it autogeneously gels, i.e. sets up, to give a temporary, fluid-tight pressure-resistant, rigid gel and subsequently disintegrates and ceases to plug.

PREFERRED EMBODIMENTS

In the practice of the present invention, sealing and plugging gel compositions gallons of said slurry: combinations of constituents based on pounds of constituent per 1,000 gallons of solution; unless otherwise noted.

| Constituent | Range | Preferred |
| --- | --- | --- |
| Hydrophobically treated galactomannan gum | 150–1,500 | 300–750 |
| A synthetic water swellable polymer suspending agent | 3–60 | 6–30 |
| Buffering agent | 12–120 | 24–60 |
| Cross-linking and hydration agent | 0.5–100 | 2.0–50 |
| Degradation agent | 0–20 | 0–10 |
| Water | | Balance to make 1,000 gals of solution |

Examples of hydrophobically treated galactomannans are guar, tragacanth, Karaya, acacia, tara, locust bean, neutral salts of alginic acid and the like. The preferred treating agent to render the gum less hydrophilic (referred to as a hydrophobing agent) is a boron-containing compound, e.g., alkali metal borates, such as sodium perborate, sodium metaborate, and sodium tetraborate. Details of one method of treating galactomannan gums with hydrophobing agents are taught in U.S. Pat. No. 2,868,664. It is preferred to use a sufficient amount of hydrophobing agent in treating the gum so that the pH of an aqueous dispersion of the gum is about neutral or slightly alkaline. By treating the gum with a hydrophobing agent, the gum is very slow to hydrate in aqueous solutions having a neutral or alkaline pH but will hydrate very quickly in acidic aqueous solutions. The exact amount of gum employed for gel stability will depend to some extent on the temperature to which the set gel will be subjected in the formation to be sealed. At higher temperature levels, e.g., greater than about 125° F., a greater amount of the gum should be present. For example, above 125° F. a gel composition containing guar gum, polyacrylamide and sodium dichromate at a total concentration of about 500 pounds/960 gallons of water has been found to be satisfactory whereas a concentration of only about 300 pounds/980 gallons of water was found practical for use at temperatures ranging from about 60° F. to 125° F.

The suspending agent usually consists of a synthetic water-dispersible polymer which hydrates very quickly in aqueous solutions. It is usually preferred that the suspending agent consist of one which forms a near neutral pH in aqueous solutions. One type of polymer found to be especially effective for this purpose is acrylamide polymers, including specifically polyacrylamide in varying degrees of hydrolysis and acrylamide copolymerized with one or more ethylenically unsaturated monomers such as acrylic acid, methacrylic acid, vinylsulfonic acid, vinylbenzylsulfonic acid, vinylbenzenesulfonic acid, and alkali and alkaline earth metal salts of such acids as described in U.S. Pat. No. 2,831,841, column 3, lines 34 to 45, and in U.S. Pat. No. 2,909,508, Examples 1 to 5. Other materials found effective are cellulose, etc. Preferably the suspending agent is employed in an amount ranging from 0.5 to 10 percent by weight of the galactomannan employed. The exact amount of suspending agent will depend on the amount of gum employed, temperature, and other constituents present in the gel solution. The presence of the suspending agent forms a slightly viscous solution thereby providing an even dispersion of the galactomannan gums in solution and prevents fluid loss of the initial solutions until the gum is hydrated and cross-linked.

A buffering agent is employed in order to adjust the pH of gums pretreated with the hydrophobing agent so that water having a wide range of pH values may be employed in preparing the indicated sealing composition. This allows for the preparation of the gel solutions at the use site, employing fresh water supplies or NaCl brines. The buffering agent should be employed in an amount so as to maintain a pH of near 8.0 in the initial solution prior to adding the hydrating and cross-linking agent. Suitable buffering agents include sodium bicarbonate, boric acid-borax, sodium carbonate-sodium bicarbonate mixture, and the like. It has been found that the present gel solution can be prepared employing water supplies having pH values ranging from about 3 to about 10. At a pH lower than 3 the gellation period is usually too quick, and at a pH higher than 10 the setting time (period for gum to hydrate and gel) is unduly prolonged.

The cross-linking and hydration agent consists of a compound which will lower the pH of the gel solution to a value where the galactomannan will hydrate and set up. It is preferred to employ a compound that induces hydration of the gum and contains a polyvalent metal cation which will cross-link the hydrated galactomannan gum employed. The cross-linked gel is found to be much stronger than a corresponding uncross-linked hydrated gum. It has been found that those polyvalent metal cations which form insoluble hydroxides at pH values lower than about 7 are most beneficial for cross-linking the galactomannan gums. Polyvalent metal cations include for example, zirconium, chromium, and tin. Cross-linking and hydration agents most desirable in the practice of the present invention consist of polyvalent metal salts of strong acids which include, for example, sodium dichromate, stannic chloride, zirconyl chloride, chromium nitrate, and other salts of strong acids which contain polyvalent metal cations which form insoluble hydroxides at pH values lower than about 7. The indicated salts, upon hydrolysis, lower the pH of aqueous solutions thus allowing the gum to hydrate and also provide the polyvalent metal cation for cross-linking the hydrated gum. Other cross-linking agents include a combination of polyvalent metal compounds which are soluble in aqueous solutions but which do not lower the pH of such solutions. Such polyvalent metals are used in combination with an acid which has a characteristic time-delayed hydrolysis rate and thus a time-delayed lowering of the pH of the solution. Such polyvalent metal compounds include, for example, sodium chromate, sodium tungstate, sodium molybate and the like. Suitable acids for use in combination with the latter compounds include propionic acid, maleic acid, succinic acid, tartaric acid, citric acid and other like acids. The cross-linking agent in the form of the first defined type may be employed in an amount ranging from 0.01 to about 20 percent by weight of the galactomannan gum to be cross-linked. The exact amount will depend on such factors as gum and buffer concentration and the temperature of the gel solution. Sodium dichromate and chromium nitrate have been found to be preferred cross-linking and hydration agents. They dissolve quickly in the aqueous solution, have a characteristic time-delayed hydrolysis rate and are crosslinkers for the galactomannan gums, e.g., guar gum.

A degradation agent is optionally employed to allow the disintegration of a set gel after a predictable predetermined period of time. The specific degradation agent employed will depend on the temperature to which the set gel is subjected. At temperatures ranging from about 125° to 200° F., $KBrO_3$ and other like materials are used to control degradation of the set gel. At temperatures ranging from about 60° to 140° F., an enzyme may be employed. The selection of a suitable enzyme for a particular gum can be determined from references well known in the art. The amount of enzyme employed in any particular gel solution as defined herein will depend on the amount of galactomannan gum present, and also upon the temperature and pH to which the set gel is to be subjected. Generally, about 0.0 to 2.0 percent by weight of enzyme of the weight of gum employed is satisfactory.

In practice, the sealing composition is prepared by thoroughly admixing the galactomannan gum, suspending agent, buffering agent and degradation agent in the necessary amount of water. The cross-linking and hydrating agent is thoroughly admixed with the so-prepared solution. The sealing composition is then pumped into the formation to be sealed and the gel will set up. The set gel will break down within a predetermined period of time, thus restoring use of the treated zone.

The following examples will facilitate a more complete understanding of the present invention, but they are not meant to limit the invention to the specific embodiments incorporated therein.

EXAMPLES 1–18

The effect of the pH of a water supply on setting time (hydration rate) of a sealing composition within the scope of the present invention was shown in the following manner. Two formulations were employed as test medium. The first formulation (noted as blend A) consisted of, as percent by weight, 93 percent guar gum, 5% $NaHCO_3$ and 2 percent of a commercially available polyacrylamide which demonstrated a pH value ranging from about 8 to 10 when 10 pounds were dissolved in 1,000 gals. of water. The second formulation (noted as blend B) consisted of 90 percent guar gum, 8% $NaHCO_3$ and 2 percent of a commercially available polyacrylamide having a substantially neutral pH in aqueous solutions.

The indicated formulations were thoroughly mixed into tap water having a preadjusted pH value. A sufficient amount of blend A or B was employed to make up solutions equivalent to a concentration of 300 pounds or 500 pounds of blend per 1,000 gallons of solution. After the blends were mixed with the water, sodium dichromate (about 3.0 percent by weight) was added and the so-formed gel solution was contained in a glass beaker. The pH of the water was adjusted by the addition of HCl or NaOH prior to the addition of the blend. The pH of the water was determined before and after mixing with each blend. The hydration rate was determined as the period of time required for the viscosity of the gel solution to reach 100 poise as measured by a Brookfield viscosimeter at 60 r.p.m. using a No. 3 or No. 4 spindle. The blend concentration of each blend, concentration of sodium dichromate (based on pounds/1,000 gallons of solution), pH of water before adding the concentrate, after adding the concentrate, after adding the sodium dichromate, and the time for the gel solution to reach 100 poise is set forth in the following Table I.

As indicated in the Table, at a pH value below about 3, i.e., Example 16, the gel solution set up immediately prior to adding the sodium dichromate catalyst. Likewise, at a pH of about 10 or more in the mixing water a prolonged setting occurred.

TABLE I

| Example Number | Blend | Concentration lbs./1,000 gal. $H_2O$ Solution | | pH of mixing water | pH after adding polymer formulations | pH after adding sodium dichromate | Time (min.) required to reach 100 poise |
|---|---|---|---|---|---|---|---|
| | | Blend | Sodium dichromate | | | | |
| 1 | A | 300 | 9 | 7.7 | 8.45 | 7.3 | 20 |
| 2 | A | 300 | 8 | 7.7 | 8.45 | 7.4 | 34 |
| 3 | A | 300 | 8 | ¹5.9 | 8.25 | 7.25 | 20 |
| 4 | A | 300 | 8 | ¹10.05 | 8.55 | 7.5 | 110 |
| 5 | A | 500 | 14 | 7.7 | 8.3 | 7.3 | 27 |
| 6 | A | 500 | 15 | 7.7 | 8.3 | 7.2 | 22 |
| 7 | B | 500 | 15 | 7.4 | 8.1 | 7.25 | 23 |
| 8 | B | 500 | 15 | ¹5.6 | 8.0 | 7.2 | 20 |
| 9 | B | 500 | 15 | 4.0 | 8.0 | 7.2 | 13 |
| 10 | B | 500 | 15 | ¹9.5 | 8.1 | 7.3 | 30 |
| 11 | B | 500 | 15 | ¹10.1 | 8.3 | 7.4 | 42 |
| 12 | B | 300 | 8 | 7.7 | 8.2 | 7.4 | 20 |
| 13 | B | 300 | 8 | ¹5.6 | 8.2 | 7.4 | 20 |
| 14 | B | 300 | 8 | ¹4.0 | 8.0 | 7.3 | 15 |
| 15 | B | 300 | 8 | ¹3.0 | 8.0 | 7.3 | 8 |
| 16 | B | 300 | 8 | ¹2.0 | Polymer gelled when added to water | | |
| 17 | B | 300 | 8 | ¹9.5 | 8.0 | 7.2 | 27 |
| 18 | B | 300 | 8 | ¹10.1 | 8.3 | 7.5 | 42 |

¹ pH of tap water adjusted with HCl or NaOH.

EXAMPLES 19-97

As in Examples 1-18, a formulation was prepared corresponding essentially to blend A of those Examples. In the present examples, tests were run to determine the plug life (i.e., the time for the set gel to degrade to reach a viscosity of 50 poise) of the gel. Various concentrations of blend A (based on pounds of blend A per 1,000 gallons of 1,000 cross-linking agent (consisting of sodium dichromate) and a degradation agent were employed; and temperatures to which the set gels were subjected are indicated. In each test, blend A was mixed into tap water. Sodium dichromate was added and then either $KBrO_3$ or an enzyme (identified as enzyme breaker D from the Stein Hall Company) was added as a degradation agent. The gel solution was allowed to set up in 4-oz. glass jars. The viscosity was determined as in Examples 1-18, at various periods of time, and the time (in days) noted when the viscosity of the gel was lowered to 50 poise or less. The temperatures employed, blend of materials, and plug life are noted in the following Table II. As these tests show, the degradation rate (plug life) can be adjusted within predetermined limits at various concentrations of gel solutions by varying the amount of degradation agent employed. As also is shown, the higher the temperature to which the set gel is subjected the shorter is its plug life, all other variables remaining constant. Likewise, the higher the concentration of the gel concentrate the longer the plug life, all other variables remaining constant.

TABLE II

| Ex. No. | Temp. (° F.) | Blend A concentration, lbs./1,000 gals. solution | Concentration of sodium dichromate, lbs./1,000 gals. solution | Enzyme of $KBrO_3$ concentration in lbs./1,000 gals. solution | | Plug life (days) |
|---|---|---|---|---|---|---|
| 19 | 60 | 300 | 12 | Enzyme | None | (¹) |
| 20 | 60 | 300 | 12 | ...do | 2.0 | 1 |
| 21 | 60 | 300 | 12 | ...do | 1.5 | 2 |
| 22 | 60 | 300 | 12 | ...do | 1.0 | 4 |
| 23 | 60 | 300 | 12 | ...do | 0.5 | 7 |
| 24 | 60 | 300 | 12 | ...do | 0.25 | 22 |
| 25 | 60 | 500 | 20 | ...do | None | (²) |
| 26 | 60 | 500 | 20 | ...do | 7.0 | 2 |
| 27 | 60 | 500 | 20 | ...do | 5.0 | 3 |
| 28 | 60 | 500 | 20 | ...do | 3.0 | 7 |
| 29 | 60 | 500 | 20 | ...do | 2.5 | 8 |
| 30 | 60 | 500 | 20 | ...do | 2.0 | 13 |
| 31 | 60 | 500 | 20 | ...do | 1.5 | 21 |
| 32 | 60 | 500 | 20 | ...do | 1.0 | (³) |
| 33 | 60 | 500 | 20 | ...do | 0.5 | (²) |
| 34 | 75 | 300 | 10 | ...do | None | 23 |
| 35 | 75 | 300 | 10 | ...do | 2.0 | 1 |
| 36 | 75 | 300 | 10 | ...do | 1.5 | 2 |
| 37 | 75 | 300 | 10 | ...do | 1.0 | 3 |
| 38 | 75 | 300 | 10 | ...do | 0.5 | 6 |
| 39 | 75 | 300 | 10 | ...do | 0.25 | 9 |
| 40 | 75 | 500 | 16 | ...do | None | (⁴) |
| 41 | 75 | 500 | 16 | ...do | 7.0 | 1 |
| 42 | 75 | 500 | 16 | ...do | 5.0 | 2 |
| 43 | 75 | 500 | 16 | ...do | 3.0 | 3 |
| 44 | 75 | 500 | 16 | ...do | 2.0 | 5 |
| 45 | 75 | 500 | 16 | ...do | 1.0 | 8 |
| 46 | 75 | 500 | 16 | ...do | 0.5 | 14 |
| 47 | 75 | 500 | 16 | ...do | 0.25 | 33 |
| 48 | 100 | 300 | 8 | ...do | None | 9 |
| 49 | 100 | 300 | 8 | ...do | 1.0 | 2 |
| 50 | 100 | 300 | 8 | ...do | 0.5 | 3.5 |
| 51 | 100 | 300 | 8 | ...do | 0.25 | 5 |
| 52 | 100 | 300 | 8 | ...do | 0.1 | 7 |
| 53 | 100 | 500 | 12 | ...do | None | (⁵) |
| 54 | 100 | 500 | 12 | ...do | 3 | 1 |
| 55 | 100 | 500 | 12 | ...do | 2 | 2 |
| 56 | 100 | 500 | 12 | ...do | 1.5 | 3.5 |
| 57 | 100 | 500 | 12 | ...do | 1 | 5 |
| 58 | 100 | 500 | 12 | ...do | 0.5 | 8 |
| 59 | 100 | 500 | 12 | ...do | 0.25 | 12 |
| 60 | 100 | 500 | 12 | ...do | 0.1 | 17 |
| 61 | 125 | 300 | 7 | ...do | None | 8 |
| 62 | 125 | 300 | 7 | ...do | 1.5 | 1 |
| 63 | 125 | 300 | 7 | ...do | 1.0 | 2 |
| 64 | 125 | 300 | 7 | ...do | 0.5 | 3 |
| 65 | 125 | 300 | 7 | ...do | 0.25 | 4 |
| 66 | 125 | 300 | 7 | ...do | 0.1 | 6 |
| 67 | 125 | 500 | 11 | ...do | None | (⁵) |
| 68 | 125 | 500 | 11 | ...do | 3.0 | 2 |
| 69 | 125 | 500 | 11 | ...do | 2.0 | 3 |
| 70 | 125 | 500 | 11 | ...do | 1.5 | 5 |
| 71 | 125 | 500 | 11 | ...do | 1.0 | 6 |
| 72 | 125 | 500 | 12 | $KBrO_3$ | None | (⁵) |
| 73 | 125 | 500 | 12 | Same | 10 | 4 |
| 74 | 125 | 500 | 12 | ...do | 7 | 5 |
| 75 | 125 | 500 | 12 | ...do | 5 | 7 |
| 76 | 125 | 500 | 12 | ...do | 3 | 11 |
| 77 | 125 | 500 | 12 | ...do | 1 | (⁵) |
| 78 | 150 | 500 | 10 | ...do | None | (⁵) |
| 79 | 150 | 500 | 10 | ...do | 10 | 2 |
| 80 | 150 | 500 | 10 | ...do | 7 | 3 |
| 81 | 150 | 500 | 10 | ...do | 5 | 5 |
| 82 | 150 | 500 | 10 | ...do | 3 | 10 |
| 83 | 150 | 500 | 10 | ...do | 1 | (⁵) |
| 84 | 175 | 500 | 8 | ...do | None | 21 |
| 85 | 175 | 500 | 8 | ...do | 7 | 1 |
| 86 | 175 | 500 | 8 | ...do | 5 | 2 |
| 87 | 175 | 500 | 8 | ...do | 3 | 4 |
| 88 | 175 | 500 | 8 | ...do | 2 | 7 |
| 89 | 175 | 500 | 8 | ...do | 1 | 11 |
| 90 | 175 | 500 | 8 | ...do | 0.5 | 16 |
| 91 | 175 | 500 | 8 | ...do | 0.25 | 18 |
| 92 | 175 | 500 | 8 | ...do | 0.1 | 20 |
| 93 | 175 | 500 | 7 | ...do | None | 14 |
| 94 | 175 | 500 | 7 | ...do | 5 | 1 |
| 95 | 175 | 500 | 7 | ...do | 3 | 2 |
| 96 | 175 | 500 | 7 | ...do | 2 | 4 |
| 97 | 175 | 500 | 7 | ...do | 1 | 8 |

¹ Longer than 36 days.  ² Longer than 40 days.  ³ Longer than 30 days.  ⁴ Longer than 33 days.  ⁵ Longer than 21 days.

EXAMPLE 98-108

This series of examples was used to determine the fluid loss and formation damage of a gel formulation within the scope of the present invention. The blend A formulation of Examples 1-18 was used as the test formulation. As a comparison, a composition containing guar gum (300 pounds/1,000 gallons solution) phthalic anhydride (3.2 pounds/1,000 gallons solution) and an enzyme (2 pounds/1,000 gallons of solution) was employed. This was a commercially available standard sealing and plugging composition. The fluid loss and formation damage were determined using Berea sandstone core plugs. The permeability of the core plug to air or to 2 percent calcium chloride brine was determined.

The blend A formulation was slurried into tap water. The degradation agent, consisting of an enzyme (enzyme breaker D) was added, followed by the sodium dichromate. The slurry was agitated with a Palo stirrer, and then by a mechanical shaker after the slurry was contained in the Baroid pressure test cell. The time elapsed before applying pressure to the cell was determined by the temperature and the approximate time which would be required for the slurry to be pumped into a wellbore. When the fluid-loss test was completed, the plug was sealed in the Baroid pressure test cell until it was degraded. The time required for degradation was obtained from the degradation tests. The core plug was removed and the permeability to 2% $CaCl_2$ brine again determined. The difference between the original $CaCl_2$ brine permeability and the final $CaCl_2$ brine permeability was the basis for calculating the percent damage caused by the plug. The results of these tests are set forth in the following Table III. As evidenced by the results obtained, the plug composition of the present invention retained fluid much better than another standard commercially employed composition.

TABLE III

| Ex. No. | Temp. (°F.) | Blend composition | Conc. blend A, lbs./1,000 gal. solution | Sodium dichromate, lbs./1,000 gal. solution | Enzyme, lbs./1,000 gal. solution | Time elapsed before pressure applied, min. | 2% CaCl₂ brine permeability before test, md. | Fluid loss in mls. after time elapsed (min.) 1 | 4 | 9 | 16 | 25 | 2% CaCl₂ brine permeability after plug degradation | Percent damage caused by plug |
|---|---|---|---|---|---|---|---|---|---|---|---|---|---|---|
| 98 | 125 | A | 300 | 7 | 2 | 15 | 421 | 0.3 | 0.4 | 0.5 | 0.5 | 0.6 | 259 | 38.0 |
| 99 | 125 | A | 500 | 11 | 3 | 15 | 404 | 0.3 | 0.6 | 0.8 | 0.9 | 1.0 | 216 | 46.5 |
| 100 | 80 | A | 300 | 7 | 2 | 5 | 445 | 0.3 | 0.5 | 0.6 | 0.8 | 1.0 | 222 | 50.0 |
| 101 | 80 | A | 300 | 7 | None | 4 | ¹542 | 3.0 | 4.0 | 4.5 | 4.5 | 5.0 | ²N.T. | ²N.T. |
| 102 | 80 | A | 300 | ³5 | None | 5 | ¹600 | 7.0 | 9.0 | 11.5 | 12.5 | 13.0 | ²N.T. | ²N.T. |
| 103 | 80 | Standard | None | None | 2 | 5 | 441 | 5.0 | 20.0 | (⁴) | (⁴) | (⁴) | 175 | 60.0 |

¹ Permeability to air.
² N.T.=Not tested.
³ Gel purposely designed to have prolonged setting time. Plug had less than 1,000 centipoise after 25 minutes hydration.
⁴ Outlet closed to retain fluid.

EXAMPLES 104–159

In these Examples, the ability of various metal ions to cross-link guar gum, locust bean gum and sodium alginate was tested. The ability to cross-link was determined by extrusion of the set gel through 4 inches of 20–40 mesh sand. The extrusion rate (mls./min.) was determined at various pressures after aging the gel. The procedure consisted of slurrying the gum into tapwater. A bactericide was then added to the water slurry to retard bacterial degradation of the gum. A cross-linking agent was then added to the slurry.

Ammonium hydroxide or acetic acid was used to adjust the slurry pH to between 6.9 and 7.1. After the slurry had obtained a viscosity of at least 1,000 centipoise, it was poured into a 2-inch diameter by 12-inch long pipe containing 4 inches of 20–40 mesh sand. The pipe caps were equipped with ¼-inch holes. The lower cap opening was covered with 20–40 mesh screen to retain the sand. The set gel was extruded with either air or hydraulic pressure. The volume of set gel extruded per minute was recorded at various pressures after aging the gel at 77° F.

The results of these tests are set forth in the following Table IV.

TABLE IV

| Ex. No. | Type of gum | Gum conc., lbs./1,000 gal. | Crosslinking agent | Concentration of metal salt (percent of gum wt.) | Extrusion Rate of the Gel (mls./min.) at various pressures after aging the gel at 77° F. | | | | | |
|---|---|---|---|---|---|---|---|---|---|---|
| | | | | | 4 hours | | | 24 hours | | |
| | | | | | 500 p.s.i. | 1,000 p.s.i. | 2,000 p.s.i. | 500 p.s.i. | 1,000 p.s.i. | 2,000 p.s.i. |
| 104 | Guar | 300 | None | None | 8.0 | 25.0 | | 14.0 | 35.0 | |
| 105 | do | 300 | CoCl₂·6H₂O | 0.1 | 14.0 | | | 3.0 | | |
| 106 | do | 300 | Same | 1.0 | 66.0 | | | 42.0 | | |
| 107 | do | 300 | do | 10.0 | 72.0 | | | 4.0 | | |
| 108 | do | 300 | Cr(NO₃)₃ | 0.1 | 5.0 | | | 4.0 | | |
| 109 | do | 300 | Same | 1.0 | 5.0 | | | 0 | 0 | 4.0 |
| 110 | do | 300 | do | 10.0 | 4.0 | | | 0 | 0 | 2.0 |
| 111 | do | 300 | ZrOCl₂ | 0.1 | 1.0 | | | 0 | 0 | 0 |
| 112 | do | 300 | Same | 1.0 | 3.0 | | | 0 | 0 | 5.0 |
| 113 | do | 300 | do | 10.0 | 70.0 | | | 6.0 | | |
| 114 | do | 300 | Al₂(SO₄)₃·18H₂O | 0.1 | 8.0 | | | 16.0 | | |
| 115 | do | 300 | Same | 1.0 | 23.9 | | | 50.0 | | |
| 116 | do | 300 | do | 10.0 | 75.0 | | | 22.0 | | |
| 117 | do | 300 | SnCl₄·5H₂O | 0.1 | 3.0 | | | 1.0 | 8.0 | |
| 118 | do | 300 | Same | 1.0 | 0 | 0 | 3.0 | 0 | 0 | 0 |
| 119 | do | 300 | do | 10.0 | 0 | 0 | 3.0 | 0 | 0 | 2.0 |
| 120 | do | 300 | NiCl₂·6H₂O | 0.1 | 0 | 0 | 4.0 | 0 | 0 | 1.0 |
| 121 | do | 300 | Same | 1.0 | 0 | 0 | 6.0 | 4.0 | 12.0 | |
| 122 | do | 300 | do | 10.0 | 2.0 | 6.0 | | 6.0 | | |
| 123 | do | 300 | CaCl₂ | 0.1 | 10.0 | | | 9.0 | | |
| 124 | do | 300 | Same | 1.0 | 6.0 | | | 5.0 | | |
| 125 | do | 300 | do | 10.0 | 5.0 | 3.0 | | 0 | 3.0 | |
| 126 | do | 300 | CrCl₂·6H₂O | 0.1 | 0 | 3.0 | | 0 | 2.0 | |
| 127 | do | 300 | Same | 1.0 | 120.0 | | | 0 | 4.0 | |
| 128 | do | 300 | do | 10.0 | 9.0 | | | 8.0 | | |
| 129 | do | 300 | FeCl₃·6H₂O | 0.1 | 5.0 | | | 6.0 | | |
| 130 | do | 300 | Same | 1.0 | 9.0 | | | 100.0 | | |
| 131 | do | 300 | do | 10.0 | 0 | 1.0 | 5.0 | 65.0 | | |
| 132 | do | 300 | FeCl₂ | 0.1 | 6.0 | | | 0 | 0 | 3 |
| 133 | do | 300 | Same | 1.0 | 1.0 | 4.0 | | 7.0 | 12.0 | |
| 134 | do | 300 | do | 10.0 | 26.0 | | | 0 | 1.0 | 2.0 |
| 135 | do | 300 | Na₂WO₄·2H₂O | 0.1 | 0 | 3.0 | 5.0 | 0 | 1.0 | 5.0 |
| 136 | do | 300 | Same | 1.0 | 0 | 1.0 | 2.0 | 0 | 0 | 1.0 |
| 137 | do | 300 | Na₂WO₄·2H₂O plus 1% zinc dust. | 10.0 | 0 | 2.0 | 6.0 | 0 | 6 | |
| 138 | do | 300 | NaMoO₄·2H₂O | 0.1 | 0 | 2.0 | 5.0 | 0 | 0 | 1.0 |
| 139 | do | 300 | Same | 1.0 | 0 | 1.0 | 4.0 | 0 | 0 | |
| 140 | do | 300 | do | 10.0 | 1.0 | 6.0 | | 0 | 3.0 | 7.0 |
| 141 | Sodium alginate | 83 | None | None | 120.0 | | | 120.0 | | |
| 142 | do | 83 | Na₂CrO₄·4H₂O | 1.0 | 204.0 | | | 168.0 | | |
| 143 | do | 83 | Same | 10.0 | 336.0 | | | 360.0 | | |
| 144 | do | 150 | None | None | 63.0 | | | 50.0 | | |
| 145 | do | 150 | Na₂CrO₄·4H₂O | 1.0 | 56.0 | | | 50.0 | | |
| 146 | do | 150 | Same | 10.0 | 52.0 | | | 18.0 | | |
| 147 | do | 150 | Cr(NO₃)₃·9H₂O | 1.0 | 19.0 | | | 7.0 | | |
| 148 | do | 150 | Same | 10.0 | 8.0 | | | 7.0 | 50.0 | |
| 149 | do | 300 | None | None | 6.0 | | | 2.0 | 50.0 | |
| 150 | do | 300 | Cr(NO₃)₃·9H₂O | 1.0 | 2.0 | 56.0 | | 1.0 | 15.0 | |
| 151 | do | 300 | Same | 10.0 | 2.0 | 48.0 | | 16.0 | | |
| 152 | Locust bean gum | 150 | None | None | 52.0 | | | 2.0 | | |
| 153 | do | 150 | Na₂CrO₄·4H₂O | 1.0 | 23.0 | | | 2.0 | | |
| 154 | do | 150 | Same | 10.0 | 17.0 | | | 5.0 | | |
| 155 | do | 150 | Cr(NO₃)₃·9H₂O | 1.0 | 2.0 | | | 22.0 | | |
| 156 | do | 150 | Same | 10.0 | 3.0 | | | 7.0 | 300.0 | |
| 157 | do | 300 | None | None | 34.0 | | | 1.0 | 54.0 | |
| 158 | do | 300 | Na₂CrO₄·4H₂O | 1.0 | 30.0 | | | 4.0 | 240.0 | |
| 159 | do | 300 | Same | 10.0 | 29.0 | | | | | |

Various modifications may be made in the present invention without departing from the spirit or scope thereof, for it is understood that we are limited only as defined in the appended claims.

What is claimed is:

1. A thickened slurry composition comprising, as pounds per 1,000 GALLONS OF SAID SLURRY:
   a. from 150 to 1,500 pounds of a galactomannan gum characterized as being hydrophobic in aqueous solutions having a neutral to alkaline pH and being hydrophillic in acidic aqueous solutions and further characterized in that an aqueous dispersion of the gum has a pH ranging from neutral to slightly alkaline;
   b. from 3 to 60 pounds of a water-swellable acrylamide polymer as a suspending agent for said galactomannan gum said polymer characterized as hydrating in aqueous solutions having a neutral to alkaline pH, and further characterized in that the pH of an aqueous dispersion of said polymer is about neutral;
   c. a sufficient amount of a buffering agent to provide an initial pH of about 8 in said slurry;
   d. from 0.5 to 100 pounds of a cross-linking hydration agent said agent characterized as hydrolyzing in an aqueous solution having a pH of about 8 after a predetermined period of time to acidify said solution and further characterized as containing a polyvalent metal ion which forms an insoluble hydroxide at PH values lower than about 7 and cross-links the hydrated form of said galactomannan gum; and
   e. water in an amount sufficient to make 1,000 gallons of said slurry.

2. The thickened slurry composition as defined in claim 1 and including up to 20 pounds of a degradation agent which will break the gel formed by a cross-linked hydrated form of said gum after a predetermined period of time.

3. The slurry composition as defined in claim 1 wherein said:
   a. galactomannan gum consists of guar gum;
   b. suspending agent consists of an acrylamide polymer having a molecular weight sufficient to thicken aqueous solutions and suspend said galactomannan gum; and
   c. cross-linking and hydrating agent consists of a salt containing a chromium metal ion.

4. The slurry composition as defined in claim 3 wherein said buffering agent consists of sodium bicarbonate, said cross-linking and hydrating agent consists of a member selected from the group consisting of sodium dichromate, chromic nitrate, or chromium chloride and said acrylamide polymer consists of polyacrylamide having a sufficient molecular weight to thicken said solution and suspend said guar gum.

5. The composition as defined in claim 2 wherein said composition consists of based on 1,000 gallons of solution:
   a. said galactomannan gum consists of guar gum about 300 TO 750 pounds;
   b. said suspending agent consists of polyacrylamide about 6 to 30 pounds;
   c. said buffering agent consists of sodium bicarbonate about 24 to 60 pounds;
   d. said cross-linking and hydrating agent consists of sodium dichromate or chromic nitrate about 2 to 50 pounds;
   e. said degradation agents consist of $KBrO_3$ or an enzyme about 0 to 10 pounds; and
   f. water in a quantity sufficient to make a total of 1,000 gallons of solution.

6. A method of sealing a selective interval of a permeable formation adjacent to a borehole comprising: injecting into said selective interval a thickened slurry composition comprising, based on pounds of component per 1,000 gallons of slurry,
   a. from 150 to 1,500 pounds of a galactomannan gum characterized as being hydrophobic in aqueous solutions having a neutral to alkaline pH and being hydrophillic in acidic aqueous solutions and further characterized in that an aqueous dispersion of the gum has a pH ranging from neutral to slightly alkaline;
   b. from 3 to 60 pounds of a water-swellable acrylamide polymer as a suspending agent for said galactomannan gum said polymer characterized as hydrating in aqueous solutions having a neutral to alkaline pH, and further characterized in that the pH of an aqueous dispersion of said polymer is about neutral;
   c. a sufficient amount of a buffering agent to provide an initial pH of about 8 in said slurry;
   d. from 0.5 to 100 pounds of a cross-linking hydration agent said agent characterized as hydrolyzing in an aqueous solution having a pH of about 8 after a predetermined period of time to acidify said solution and further characterized as containing a polyvalent metal ion which forms an insoluble hydroxide at PH values lower than about 7 and cross-links the hydrated form of said galactomannan gum; and
   e. water in an amount sufficient to make 1,000 gallons of said slurry.

7. The method as defined in claim 6 wherein said composition includes in addition up to about 20 pounds of a degradation agent which breaks the gel formed by the cross-linked galactomannan gum after a predetermined period of time.

* * * * *

PO-1050
(5/69)

UNITED STATES PATENT OFFICE
CERTIFICATE OF CORRECTION

Patent No. 3,615,794      Dated 26 October 1971

Inventor(s) Kenneth H. Nimerick

It is certified that error appears in the above-identified patent and that said Letters Patent are hereby corrected as shown below:

Column 1, line 4, delete "em-"; line 5 delete "ploy fibrous" and insert -- of --; in line 63 delete "gallons of said slurry:" and insert -- consists of the following --.

Column 5, line 7, delete "of 1,000" and insert --of solution)--; in line 32, in the 5th heading of Table II, change "Enzyme of $KBrO_3$" to read -- Enzyme or $KBrO_3$--.

In columns 7 and 8, Table IV, insert the following headings between Ex. No. 140 and 141 after the column headed "Concentration of metal salt (percent of gum wt.)":

| 50 psi | 100 psi | 200 psi | 500 psi | 50 psi | 100 psi | 200 psi | 500 psi |

Signed and sealed this 20th day of June 1972.

(SEAL)
Attest:

EDWARD M. FLETCHER, JR.
Attesting Officer

ROBERT GOTTSCHALK
Commissioner of Patents